US011821686B2

(12) United States Patent
Eichhorn et al.

(10) Patent No.: US 11,821,686 B2
(45) Date of Patent: Nov. 21, 2023

(54) RADIO FREQUENCY MOISTURE-REMOVAL SYSTEM

(71) Applicant: Drymax DDG LLC, Eden Prairie, MN (US)

(72) Inventors: Kevin Eichhorn, Chanhassen, MN (US); Pratheik Ajit, Chanhassen, MN (US); Havneet Singh, Chanhassen, MN (US)

(73) Assignee: Drymax DDG LLC, Eden Prairie, MN (US)

( * ) Notice: Subject to any disclaimer, the term of this patent is extended or adjusted under 35 U.S.C. 154(b) by 0 days.

(21) Appl. No.: 17/667,157

(22) Filed: Feb. 8, 2022

(65) Prior Publication Data

US 2022/0341660 A1    Oct. 27, 2022

Related U.S. Application Data

(63) Continuation of application No. 16/803,473, filed on Feb. 27, 2020, now Pat. No. 11,243,027.

(51) Int. Cl.
*F26B 5/00* (2006.01)
*A23N 12/08* (2006.01)

(52) U.S. Cl.
CPC .............. *F26B 5/00* (2013.01); *A23N 12/08* (2013.01)

(58) Field of Classification Search
CPC ...... F26B 2200/06; F26B 17/124; F26B 3/00; F26B 5/00; F26B 3/347; A23N 12/08; A23N 9/08

(Continued)

(56) References Cited

U.S. PATENT DOCUMENTS 1,715,830 A * 6/1929 Glinka .................. F26B 17/124
  34/174
2,740,756 A * 4/1956 Thomas ................. B01D 61/56
  34/247

(Continued)

FOREIGN PATENT DOCUMENTS

GB         2429143 A  *  2/2007  ............ F26B 11/181
WO   WO-2007007068 A1 *  1/2007  ............ F26B 11/181
WO      2007110872      10/2007

OTHER PUBLICATIONS

International Search Report and Written Opinion corresponding to PCT/US21/60312 dated Feb. 23, 2022.

*Primary Examiner* — Stephen M Gravini
(74) *Attorney, Agent, or Firm* — Patterson Thuente, P.A.

(57) ABSTRACT

Disclosed herein are devices systems and methods for removing moisture from a material via radio frequency electromagnetic wave exposure. A moisture-removal system can include having spaced apart a first and a second electrical conductor extending along a same first direction, each of the first and second electrical conductor comprising opposing broad top and bottom sides, the broad bottom side of the first electrical conductor facing the broad top side of the second electrical conductor. The system includes a material containing moisture at least partially filling the space between the first and the second electrical conductor. The system further includes at least one first wire attached to a first radio frequency generator and to the first end of the first electrical conductor. The system also includes at least one second wire attached to the electrical ground of the first radio frequency generator to the first end of the second electrical conductor.

20 Claims, 6 Drawing Sheets

(58) Field of Classification Search
USPC .......................................................... 34/255
See application file for complete search history.

(56) References Cited

U.S. PATENT DOCUMENTS

| | | | | |
|---|---|---|---|---|
| 4,283,862 | A * | 8/1981 | Candor | B01D 43/00 |
| | | | | 34/254 |
| 5,656,238 | A * | 8/1997 | Spencer | F26B 5/00 |
| | | | | 422/23 |
| 6,098,306 | A * | 8/2000 | Ramsey | F26B 25/006 |
| | | | | 134/30 |
| 9,810,480 | B2 * | 11/2017 | Sears | F26B 17/12 |
| 9,879,908 | B2 * | 1/2018 | Triglia, Jr. | F26B 3/347 |
| 10,962,284 | B2 * | 3/2021 | Heine | A23B 9/08 |
| 11,243,027 | B2 * | 2/2022 | Eichhorn | F26B 5/00 |
| 2003/0046826 | A1 | 3/2003 | Snaper | |
| 2009/0294440 | A1 * | 12/2009 | Adrian | F26B 3/347 |
| | | | | 219/750 |
| 2010/0115785 | A1 * | 5/2010 | Ben-Shmuel | H05B 6/72 |
| | | | | 34/260 |
| 2014/0038431 | A1 * | 2/2014 | Stowell | H01L 21/67115 |
| | | | | 438/795 |
| 2014/0283407 | A1 | 9/2014 | Hultgren | |
| 2015/0247266 | A1 | 9/2015 | Nimmo, Sr. | |
| 2019/0178575 | A1 | 6/2019 | Heine | |
| 2022/0341660 | A1 * | 10/2022 | Eichhorn | F26B 5/00 |

* cited by examiner

RADIO FREQUENCY MOISTURE-REMOVAL SYSTEM

RELATED APPLICATION

This application is a continuation of application Ser. No. 16/803,473, filed Feb. 27, 2020, now U.S. Pat. No. 11,243,027, issued Feb. 8, 2022, which is hereby fully incorporated herein by reference.

TECHNICAL FIELD

The present invention relates to moisture-removal systems utilizing electromagnetic radio-frequency fields to remove water from different materials including agricultural biomass products such as harvest crops, grains, fruits, etc., waste materials such as manure, human waste etc., and inorganic materials such as construction aggregate materials, wet sand etc.

BACKGROUND

Conventional methods for removing moisture or water from different materials are expensive and suffer from poor energy efficiencies. Systems that rely on spread-air type drying methods require large ventilated area, are weather dependent and time consuming. Similarly, heat-assisted drying systems are expensive, suffer from poor and uneven heating and, in the case of agricultural products, may cause heat damage to harvest crop, fruits and grains. Some recent methods employing electromagnetic radio-frequency fields are limited to low volumes, suffer from uneven drying and still cause some heat damage to the crop.

SUMMARY

The disclosure generally relates to moisture-removal systems, utilizing electromagnetic radio-frequency fields, including an assembly of electrical transmission lines, electromagnetic radio-frequency generators, cables, and related electrical components. In particular, the present disclosure provides an energy-efficient electromagnetic radio-frequency drying system that uses propagating transmission-line electromagnetic modes to remove moisture from a variety of materials at low temperatures with minimal heat damage to the materials.

In one aspect, the present disclosure provides a moisture-removal system that includes having spaced apart a first and a second electrical conductor extending along a same first direction, each of the first and the second electrical conductor comprising opposing broad top and bottom sides, the broad bottom side of the first electrical conductor facing the broad top side of the second electrical conductor; and a material containing moisture at least partially filling the space between the first and the second electrical conductor. The moisture-removal system further includes at least one first wire with a first and a second end, the first end of the first wire attached to a first radio frequency generator and the second end of the first wire attached to the first end of the first electrical conductor. The moisture-removal system further includes a common electrical grounding system, comprising at least one second wire with a first and a second end, with the first end of the second wire attached to the electrical ground of the first radio frequency generator and the second end of the second wire attached to the first end of the second electrical conductor.

In another aspect, the present disclosure provides a moisture-removal system that includes having spaced apart a first and a second electrical conductor extending along a same first direction, each of the first and second electrical conductor comprising opposing broad top and bottom sides, and each of the first and second electrical conductor having at least one hole extending from its broad top side to its broad bottom side; further the broad bottom side of the first electrical conductor facing the broad top side of the second electrical conductor; and a material containing moisture at least partially filling the space between the first and the second electrical conductor. The moisture-removal system further includes at least one first wire with a first and a second end, the first end of the first wire attached to a first radio frequency generator and the second end of the first wire attached to the first end of the first electrical conductor. The moisture-removal system further includes a common electrical grounding system, comprising at least one second wire with a first and a second end, with the first end of the second wire attached to the electrical ground of the first radio frequency generator and the second end of the second wire attached to the first end of the second electrical conductor.

In another aspect, the present disclosure provides a moisture-removal system that includes having spaced apart a first and a second electrical conductor extending along a same first direction, each of the first and second electrical conductor comprising opposing broad top and bottom sides, the broad bottom side of the first electrical conductor facing the broad top side of the second electrical conductor; and a material containing moisture at least partially filling the space between the first and the second electrical conductor. The moisture-removal system further includes at least one first coaxial cable with a first and a second end, the first coaxial cable comprising a central conductor and an outer shield, the first end of the first coaxial cable is attached to a first radio frequency generator and the second end of the first coaxial cable is attached to the first and second electrical conductors such that the central conductor of the first coaxial cable is attached to the first end of the first electrical conductor and the outer shield of the first coaxial cable is attached to the first end of the second electrical conductor.

In another aspect, the present disclosure provides a moisture-removal system that includes having spaced apart a first and a second electrical conductor extending along a same first direction, each of the first and the second electrical conductor comprising opposing broad top and bottom sides, and each of the first and the second electrical conductor having at least one hole extending from its broad top side to its broad bottom side; further the broad bottom side of the first electrical conductor facing the broad top side of the second electrical conductor; and a material containing moisture at least partially filling the space between the first and the second electrical conductor. The moisture-removal system further includes at least one first coaxial cable with a first and a second end, the first coaxial cable comprising a central conductor and an outer shield, the first end of the first coaxial cable is attached to a first radio frequency generator and the second end of the first coaxial cable is attached to the first and the second electrical conductors such that the central conductor of the first coaxial cable is attached to the first end of the first electrical conductor and the outer shield of the first coaxial cable is attached to the first end of the second electrical conductor.

In another aspect, the present disclosure provides a moisture-removal system that includes having spaced apart a first and a second electrical conductor extending along a same first direction, each of the first and second electrical conductor comprising opposing broad top and bottom sides, the broad bottom side of the first electrical conductor facing the broad top side of the second electrical conductor; and a material containing moisture at least partially filling the space between the first and the second electrical conductor. The moisture-removal system further includes a first inductor-capacitor assembly, comprising at least one inductor and at least one capacitor, and having a first, a second and a third end. The moisture-removal system further includes at least one first wire with a first and a second end, the first end of the first wire attached to a first radio frequency generator and the second end of the first wire attached to the first end of the first inductor-capacitor assembly. The moisture-removal system further includes a common electrical grounding system, comprising at least one second wire with a first and a second end, the first end of the second wire attached to the electrical ground of the first radio frequency generator and the second end of the second wire attached to the third end of the first inductor-capacitor assembly. The moisture-removal system further includes at least a third and a fourth electrical wire, each with a first end and a second end, the first end of the third wire attached to the second end of the first inductor-capacitor assembly, and the second end of the third wire attached to the first end of the first electrical conductor. Further, the first end of the fourth wire is attached to the third end of the first inductor-capacitor assembly and the second end of the fourth wire is attached to the first end of the second electrical conductor.

In another aspect, the present disclosure provides a moisture-removal system that includes having spaced apart a first and a second electrical conductor extending along a same first direction, each of the first and the second electrical conductor comprising opposing broad top and bottom sides, and each of the first and second electrical conductor having at least one hole extending from its broad top side to its broad bottom side; further the broad bottom side of the first electrical conductor facing the broad top side of the second electrical conductor; and a material containing moisture at least partially filling the space between the first and the second electrical conductor. The moisture-removal system further includes a first inductor-capacitor assembly, comprising at least one inductor and at least one capacitor, and having a first, a second and a third end. The moisture-removal system further includes at least one first wire with a first and a second end, the first end of the first wire attached to a first radio frequency generator and the second end of the first wire attached to the first end of the first inductor-capacitor assembly. The moisture-removal system further includes a common electrical grounding system, comprising at least one second wire with a first and a second end, the first end of the second wire attached to the electrical ground of the first radio frequency generator and the second end of the second wire attached to the third end of the first inductor-capacitor assembly. The moisture-removal system further includes at least a third and a fourth electrical wire, each with a first end and a second end, the first end of the third wire attached to the second end of the first inductor-capacitor assembly, and the second end of the third wire attached to the first end of the first electrical conductor. Further, the first end of the fourth wire is attached to the third end of the first inductor-capacitor assembly and the second end of the fourth wire is attached to the first end of the second electrical conductor.

In another aspect, the present disclosure provides a moisture-removal system that includes having spaced apart a first and a second electrical conductor extending along a same first direction, each of the first and second electrical conductor comprising opposing broad top and bottom sides, the broad bottom side of the first electrical conductor facing the broad top side of the second electrical conductor; and a material containing moisture at least partially filling the space between the first and the second electrical conductor. The moisture-removal system further includes a first inductor-capacitor assembly, comprising at least one inductor and at least one capacitor, and having a first, a second and a third end. The moisture-removal system further includes at least a first and a second coaxial cable, each with a first and a second end; each of the first and the second coaxial cable comprising a central conductor and an outer shield. Further, the first end of the first coaxial cable is attached to a first radio frequency generator and the second end of the first coaxial cable is attached to the first inductor-capacitor assembly such that the central conductor of the first coaxial cable is attached to the first end of the first inductor-capacitor assembly and the outer shield of the first coaxial cable is attached to the third end of the first inductor-capacitor assembly. Similarly, the first end of the second coaxial cable is attached to the first inductor-capacitor assembly such that the central conductor of the second coaxial cable is attached to the second end of the inductor-capacitor assembly and the outer shield of the second coaxial cable is attached to the third end of the first inductor-capacitor assembly. Further, at the second end of the second coaxial cable, the central conductor of the second coaxial cable is attached to the first end of the first electrical conductor and the outer shield of the second coaxial cable is attached to the first end of the second electrical conductor.

In another aspect, the present disclosure provides a moisture-removal system that includes having spaced apart a first and a second electrical conductor extending along a same first direction, each of the first and second electrical conductor comprising opposing broad top and bottom sides, and each of the first and second electrical conductor having at least one hole extending from its broad top side to its broad bottom side; further the broad bottom side of the first electrical conductor facing the broad top side of the second electrical conductor; and a material containing moisture at least partially filling the space between the first and the second electrical conductor. The moisture-removal system further includes a first inductor-capacitor assembly, comprising at least one inductor and at least one capacitor, and having a first, a second and a third end. The moisture-removal system further includes at least a first and a second coaxial cable, each having a first and a second end; the first and the second coaxial cable each comprising a central conductor and an outer shield. Further, the first end of the first coaxial cable is attached to a first radio frequency generator and the second end of the first coaxial cable is attached to the first inductor-capacitor assembly such that the central conductor of the first coaxial cable is attached to the first end of the first inductor-capacitor assembly and the outer shield of the first coaxial cable is attached to the third end of the first inductor-capacitor assembly. Similarly, the first end of the second coaxial cable is attached to the first inductor-capacitor assembly such that the central conductor of the second coaxial cable is attached to the second end of the inductor-capacitor assembly and the outer shield of the second coaxial cable is attached to the third end of the first inductor-capacitor assembly. Further, at the second end of the second coaxial cable, the central conductor of the second coaxial cable is attached to the first end of the first electrical conductor and the outer shield of the second coaxial cable is attached to the first end of the second electrical conductor.

In yet another aspect, the present disclosure provides a moisture-removal system that includes having spaced apart a first, a second and a third electrical conductor extending along a same first direction, each of the first, the second and the third electrical conductor comprising opposing broad top and broad bottom sides, the broad bottom side of the first electrical conductor facing the broad top side of the second electrical conductor and the broad bottom side of the second electrical conductor facing the broad top side of the third electrical conductor; and a material containing moisture at least partially filling the space between the first and the second electrical conductor or between the second and the third electrical conductor. The moisture-removal system further includes at least one first wire with a first and a second end, the first end of the first wire attached to a first radio frequency generator and the second end of the first wire attached to the first end of the second electrical conductor. The moisture-removal system further includes a common electrical grounding system, comprising at least a second and a third wire, each having a first and a second end; the first end of the second wire and the first end of the third wire attached to the electrical ground of the first radio frequency generator, and the second end of the second wire attached to the first end of the first electrical conductor and the second end of the third wire attached to the first end of the third electrical conductor.

In yet another aspect, the present disclosure provides a moisture-removal system that includes having spaced apart a first, a second and a third electrical conductor extending along a same first direction; each of the first, the second and the third electrical conductor comprising opposing broad top and bottom sides, and each of the first, the second and the third electrical conductor having at least one hole extending from its broad top side to broad bottom side; the broad bottom side of the first electrical conductor facing the broad top side of the second electrical conductor and the broad bottom side of the second electrical conductor facing the broad top side of the third electrical conductor; and a material containing moisture at least partially filling the space between the first and the second electrical conductor or between the second and the third electrical conductor. The moisture-removal system further includes at least one first wire with a first end and a second end, the first end of the first wire attached to a first radio frequency generator and the second end of the first wire attached to the first end of the second electrical conductor. The moisture-removal system further includes a common electrical grounding system, comprising at least a second and a third wire, each having a first end and a second end; the first end of the second wire and the first end of the third wire attached to the electrical ground of the first radio frequency generator and the second end of the second wire attached to the first end of the first electrical conductor and the second end of the third wire attached to the first end of the third electrical conductor.

In yet another aspect, the present disclosure provides a moisture-removal system that includes a first assembly of electrical conductors comprising having spaced apart a first, a second and a third electrical conductor extending along a same first direction; each of the first, the second and the third electrical conductor comprising opposing broad top and bottom sides; the broad bottom side of the first electrical conductor facing the broad top side of the second electrical conductor and the broad bottom side of the second electrical conductor facing the broad top side of the third electrical conductor; and a material containing moisture at least partially filling the space between the first and the second electrical conductor or between the second and the third electrical conductor. The moisture-removal system further includes at least one first coaxial cable with a first end and a second end, the first coaxial cable comprising a central conductor and an outer shield; the first end of the first coaxial cable attached to a first radio frequency generator and the second end of the first coaxial cable is attached to the first assembly of the electrical conductors such that the central conductor of the first coaxial cable is attached to the first end of the second electrical conductor and the outer shield of the first coaxial cable is attached to the first end of the first electrical conductor and the first end of the third electrical conductor via at least one electrical wire.

In yet another aspect, the present disclosure provides a moisture-removal system that includes a first assembly of electrical conductors comprising having spaced apart a first, a second and a third electrical conductor extending along a same first direction; each of the first, the second and the third electrical conductor having at least one hole extending from its broad top side to broad bottom side; and each of the first, the second and the third electrical conductor comprising opposing broad top and bottom sides, the broad bottom side of the first electrical conductor facing the broad top side of the second electrical conductor and the broad bottom side of the second electrical conductor facing the broad top side of the third electrical conductor; and a material containing moisture at least partially filling the space between the first and the second electrical conductor or between the second and the third electrical conductor. The moisture-removal system further includes at least one first coaxial cable, having a first end and a second end, and comprising a central conductor and an outer shield; the first end of the first coaxial cable attached to a first radio frequency generator and the second end of the first coaxial cable is attached to the first assembly of the electrical conductors such that the central conductor of the first coaxial cable is attached to the first end of the second electrical conductor and the outer shield of the first coaxial cable is attached to the first end of the first electrical conductor and the first end of the third electrical conductor via at least one electrical wire.

In yet another aspect, the present disclosure provides a moisture-removal system that includes a first assembly of electrical conductors comprising having spaced apart a first, a second and a third electrical conductor extending along a same first direction, and each conductor comprising opposing broad top and broad bottom sides; the broad bottom side of the first electrical conductor facing the broad top side of the second electrical conductor and the broad bottom side of the second electrical conductor facing the broad top side of the third electrical conductor; and a material containing moisture at least partially filling the space between the first and the second electrical conductor or between the second and the third electrical conductor. The moisture-removal system further includes a first inductor-capacitor assembly, comprising at least one inductor and at least one capacitor, and having a first, a second and a third end. The moisture-removal system further includes at least one first wire with a first end and a second end, the first end of the first wire attached to a first radio frequency generator and the second end of the first wire attached to the first end of the first inductor-capacitor assembly. The moisture-removal system further includes a common electrical grounding system, comprising at least one second wire with a first end and a second end, with the first end of the second wire attached to the electrical ground of the first radio frequency generator and the second end of the second wire attached to the third end of the first inductor-capacitor assembly. The moisture-removal system further includes at least a third, a fourth and a fifth electrical wire, each having a first end and a second end; the first end of the third wire attached to the second end of the first inductor-capacitor assembly and the second end of the third wire is attached to the first end of the second electrical conductor. Further, the first end of the fourth wire is attached to the third end of the first inductor-capacitor assembly and the second end of the fourth wire is attached to the first end of the first electrical conductor. Similarly, the first end of the fifth wire is attached to the third end of the first inductor-capacitor assembly and the second end of the fifth wire is attached to the first end of the third electrical conductor.

In yet another aspect, the present disclosure provides a moisture-removal system that includes a first assembly of electrical conductors comprising having spaced apart a first, a second and a third electrical conductor extending along a same first direction, and each conductor comprising opposing broad top and bottom sides, and each of the first, the second and the third electrical conductor having at least one hole extending from its broad top side to broad bottom side; the broad bottom side of the first electrical conductor facing the broad top side of the second electrical conductor and the broad bottom side of the second electrical conductor facing the broad top side of the third electrical conductor; and a material containing moisture at least partially filling the space between the first and the second electrical conductor or between the second and the third electrical conductor. The moisture-removal system further includes a first inductor-capacitor assembly, comprising at least one inductor and at least one capacitor, and having a first, a second and a third end. The moisture-removal system further includes at least one first wire with a first end and a second end, the first end of the first wire attached to a first radio frequency generator and the second end of the first wire attached to the first end of the first inductor-capacitor assembly. The moisture-removal system further includes a common electrical grounding system, comprising at least one second wire with a first end and a second end, the first end of the second wire attached to the electrical ground of the first radio frequency generator and the second end of the second wire attached to the third end of the first inductor-capacitor assembly. The moisture-removal system further includes at least a third, a fourth and a fifth electrical wire, each having a first end and a second end, the first end of the third wire attached to the second end of the first inductor-capacitor assembly, and the second end of the third wire is attached to the first end of the second electrical conductor. Further, the first end of the fourth wire is attached to the third end of the first inductor-capacitor assembly and the second end of the fourth wire is attached to the first end of the first electrical conductor. Similarly, the first end of the fifth wire is attached to the third end of the first inductor-capacitor assembly and the second end of the fifth wire is attached to the first end of the third electrical conductor.

In yet another aspect, the present disclosure provides a moisture-removal system that includes a first assembly of electrical conductors comprising having spaced apart a first, a second and a third electrical conductor, extending along a same first direction; each conductor of the first assembly comprising opposing broad top and broad bottom sides such that the broad bottom side of the first electrical conductor facing the broad top side of the second electrical conductor and the broad bottom side of the second electrical conductor facing the broad top side of the third electrical conductor; and a material containing moisture at least partially filling the space between the first and the second electrical conductor or between the second and the third electrical conductor. The moisture-removal system further includes a first inductor-capacitor assembly, comprising at least one inductor and one capacitor and having a first, a second and a third end. The moisture-removal system further includes at least a first and a second coaxial cable, each having a first end and a second end, and each cable comprising a central conductor and an outer shield. Further, the first end of the first coaxial cable is attached to a first radio frequency generator and the second end of the first coaxial cable attached to the first inductor-capacitor assembly such that the central conductor of the first coaxial cable is attached to the first end of the inductor-capacitor assembly and the outer shield of the first coaxial cable is attached to the third end of the first inductor-capacitor assembly. Similarly, the first end of the second coaxial cable is attached to the first inductor-capacitor assembly such that the central conductor of the second coaxial cable is attached to the second end of the first inductor-capacitor assembly and the outer shield of the second coaxial cable is attached to the third end of the first inductor-capacitor assembly. Further, at the second end of the second coaxial cable, the central conductor of the second coaxial cable is attached to the first end of the second electrical conductor and the outer shield of the second coaxial cable is attached to the first end of the first electrical conductor and to the first end of the third electrical conductor via at least one wire.

In yet another aspect, the present disclosure provides a moisture-removal system that includes a first assembly of electrical conductors comprising having spaced apart a first, a second and a third electrical conductor, each extending along a same first direction and each comprising opposing broad top and broad bottom sides; each of the first, the second and the third electrical conductor having at least one hole extending from its broad top side to its broad bottom side; the broad bottom side of the first electrical conductor facing the broad top side of the second electrical conductor and the broad bottom side of the second electrical conductor facing the broad top side of the third electrical conductor; and a material containing moisture at least partially filling the space between the first and the second electrical conductor or between the second and the third electrical conductor. The moisture-removal system further includes a first inductor-capacitor assembly comprising at least one inductor and one capacitor and having a first end, a second end and a third end. The moisture-removal system further includes at least a first and a second coaxial cable, each having a first end and a second end and each coaxial cable comprising a central conductor and an outer shield. Further, the first end of the first coaxial cable is attached to a first radio frequency generator and the second end of the first coaxial cable attached to the first inductor-capacitor assembly such that the central conductor of the first coaxial cable is attached to the first end of the inductor-capacitor assembly and the outer shield of the first coaxial cable is attached to the third end of the first inductor-capacitor assembly. Similarly, the first end of the second coaxial cable is attached to the first inductor-capacitor assembly such that the central conductor of the second coaxial cable is attached to the second end of the first inductor-capacitor assembly and the outer shield of the second coaxial cable is attached to the third end of the first inductor-capacitor assembly. Further, at the second end of the second coaxial cable, the central conductor of the second coaxial cable is attached to the first end of the second electrical conductor and the outer shield of the second coaxial cable is attached to the first end of the first electrical conductor and to the first end of the third electrical conductor via at least one wire.

In yet another aspect, the present disclosure provides a moisture-removal system that includes a first assembly of having spaced apart a first, a second and a third electrical conductor, each having a first and a second end and each extending along a same first direction; each conductor of the first assembly comprising opposing broad top and broad bottom sides such that the broad bottom side of the first electrical conductor facing the broad top side of the second electrical conductor and the broad bottom side of the second electrical conductor facing the broad top side of the third electrical conductor; and a material containing moisture at least partially filling the space between the first and the second electrical conductor or the space between the second and the third electrical conductor. The moisture-removal system further includes a second assembly of having spaced apart a fourth, a fifth and a sixth electrical conductor, each with a first and a second end, and each extending along the same first direction; each conductor of the second assembly comprising opposing broad top and bottom sides and opposing narrow edges; the broad bottom side of the fourth electrical conductor facing the broad top side of the fifth electrical conductor and the broad bottom side of the fifth electrical conductor facing the broad top side of the sixth electrical conductor; the distance between the narrow edges of each conductor of the second assembly gradually increases from their first ends to their second ends such that the second end of the fourth conductor is as wide as the first end of the first conductor, the second end of the fifth conductor is as wide as the first end of the second conductor and the second end of the sixth conductor is as wide as the first end of the third electrical conductor. Similarly, the spacing between the fourth, fifth and sixth electrical conductors gradually increasing from their first ends to their second ends such that the second end of the fourth electrical conductor touching the first end of the first electrical conductor, the second end of the fifth electrical conductor touching the first end of the second electrical conductor and the second end of the sixth electrical conductor touching the first end of the third electrical conductor. Similarly, the distance between the opposing narrow edges of each of the fourth, fifth and the sixth electrical conductors and the spacing between the fourth, fifth and the sixth electrical conductors at their first ends are of the order that a first coaxial connector of a suitable size can be mounted on the second assembly with the outer ground of the first coaxial connector touching the fourth and the sixth electrical conductors and the center pin of the first coaxial connector touching the fifth electrical conductor. Further, the moisture-removal system includes at least one first coaxial cable, having a first end and a second end, and comprising a central conductor and an outer shield; the first end of the coaxial cable is attached to a first radio frequency generator and the second end of the first coaxial cable is attached to the first coaxial connector.

In yet another aspect, the present disclosure provides a moisture-removal system that includes a first assembly of having spaced apart a first, a second and a third electrical conductor, each having a first and a second end and each extending along a same first direction; each conductor of the first assembly comprising opposing broad top and broad bottom sides such that the broad bottom side of the first electrical conductor facing the broad top side of the second electrical conductor and the broad bottom side of the second electrical conductor facing the broad top side of the third electrical conductor; and each conductor of the first assembly having at least one hole extending from its broad top side to broad bottom side; and a material containing moisture at least partially filling the space between the first and the second electrical conductor or the space between the second and the third electrical conductor. The moisture-removal system further includes a second assembly of having spaced apart a fourth, a fifth and a sixth electrical conductor, each with a first and a second end, and each extending along the same first direction; each conductor of the second assembly comprising opposing broad top and bottom sides and opposing narrow edges; the broad bottom side of the fourth electrical conductor facing the broad top side of the fifth electrical conductor and the broad bottom side of the fifth electrical conductor facing the broad top side of the sixth electrical conductor; the distance between the In yet another aspect, the present disclosure provides a moisture-removal system that includes a first assembly of having spaced apart a first, a second and a third electrical conductor, each having a first and a second end and each extending along a same first direction; each conductor of the first assembly comprising opposing broad top and bottom sides and narrow edges, with the broad bottom side of the first electrical conductor facing the broad top side of the second electrical conductor and the broad bottom side of the second electrical conductor facing the broad top side of the third electrical conductor; and a material containing moisture at least partially filling the space between the first and the second electrical conductor or the space between the second and the third electrical conductor. The moisture-removal system further includes a second assembly of having spaced apart a fourth, a fifth and a sixth electrical conductor, each with a first and a second end, and each extending along the same first direction; each conductor of the second assembly comprising opposing broad top and bottom sides and opposing narrow edges; the broad bottom side of the fourth electrical conductor facing the broad top side of the fifth electrical conductor and the broad bottom side of the fifth electrical conductor facing the broad top side of the sixth electrical conductor; the distance between the narrow edges of each conductor of the second assembly gradually increases from their first ends to their second ends such that the second end of the fourth conductor is as wide as the first end of the first conductor, the second end of the fifth conductor is as wide as the first end of the second conductor and the second end of the sixth conductor is as wide as the first end of the third electrical conductor. Similarly, the spacing between the fourth, fifth and sixth electrical conductors gradually increasing from their first ends to their second ends such that the second end of the fourth electrical conductor touching the first end of the first electrical conductor, the second end of the fifth electrical conductor touching the first end of the second electrical conductor and the second end of the sixth electrical conductor touching the first end of the third electrical conductor. Similarly, the distance between the opposing narrow edges of each of the fourth, fifth and the sixth electrical conductors and the spacing between the fourth, fifth and the sixth electrical conductors at their first ends are of the order that a first coaxial connector of a suitable size can be mounted on the second assembly with the outer ground of the first coaxial connector touching the fourth and the sixth electrical conductors and the center pin of the first coaxial connector touching the fifth electrical conductor. Further, the moisture-removal system includes at least one first coaxial cable, having a first end and a second end, and comprising a central conductor and an outer shield; the first end of the coaxial cable is attached to a first radio frequency generator and the second end of the first coaxial cable is attached to the first coaxial connector. The moisture-removal system further includes a third assembly of having spaced apart a seventh, an eighth and a ninth electrical conductor, each with a first and a second end, and each extending along the same first direction; each conductor of the third assembly comprising opposing broad top and bottom sides and opposing narrow edges; the broad bottom side of the seventh electrical conductor facing the broad top side of the eighth electrical conductor and the broad bottom side of the eighth electrical conductor facing the broad top side of the ninth electrical conductor; the distance between the narrow edges of each conductor of the third assembly gradually decreasing from their first ends to their second ends such that the first end of the seventh conductor is as wide as the second end of the first conductor, the first end of the eighth conductor is as wide as the second end of the second conductor and the first end of the ninth conductor is as wide as the second end of the third electrical conductor. Similarly, the spacing between the seventh, eighth and ninth electrical conductors gradually decreasing from their first ends to their second ends such that the first end of the seventh electrical conductor touching the second end of the first electrical conductor, the first end of the eighth electrical conductor touching the second end of the second electrical conductor and the first end of the sixth electrical conductor touching the second end of the third electrical conductor. Similarly, the distance between the opposing narrow edges of each of the seventh, eighth and ninth electrical conductors and the spacing between them at their second ends are of the order that a second coaxial connector of a suitable size can be mounted on the third assembly with the outer ground of the second coaxial connector touching the seventh and ninth electrical conductors and the center pin of the second coaxial connector touching the ninth electrical conductor. Further, the moisture-removal system includes at least one 50 ohm coaxial termination connected to the second coaxial connector.

In yet another aspect, the present disclosure provides a moisture-removal system that includes a first assembly of having spaced apart a first, a second and a third electrical conductor, each having a first and a second end and each extending along a same first direction; each conductor of the first assembly comprising opposing broad top and bottom sides and narrow edges, with the broad bottom side of the first electrical conductor facing the broad top side of the second electrical conductor and the broad bottom side of the second electrical conductor facing the broad top side of the third electrical conductor; and each conductor of the first assembly having at least one hole extending from its broad top side to broad bottom side; and a material containing moisture at least partially filling the space between the first and the second electrical conductor or the space between the second and the third electrical conductor. The moisture-removal system further includes a second assembly of having spaced apart a fourth, a fifth and a sixth electrical conductor, each with a first and a second end, and each extending along the same first direction; each conductor of the second assembly comprising opposing broad top and bottom sides and opposing narrow edges; the broad bottom side of the fourth electrical conductor facing the broad top side of the fifth electrical conductor and the broad bottom side of the fifth electrical conductor facing the broad top side of the sixth electrical conductor; the distance between the narrow edges of each conductor of the second assembly gradually increases from their first ends to their second ends such that the second end of the fourth conductor is as wide as the first end of the first conductor, the second end of the fifth conductor is as wide as the first end of the second conductor and the second end of the sixth conductor is as wide as the first end of the third electrical conductor. Similarly, the spacing between the fourth, fifth and sixth electrical conductors gradually increasing from their first ends to their second ends such that the second end of the fourth electrical conductor touching the first end of the first electrical conductor, the second end of the fifth electrical conductor touching the first end of the second electrical conductor and the second end of the sixth electrical conductor touching the first end of the third electrical conductor. Similarly, the distance between the opposing narrow edges of each of the fourth, fifth and the sixth electrical conductors and the spacing between the fourth, fifth and the sixth electrical conductors at their first ends are of the order that a first coaxial connector of a suitable size can be mounted on the second assembly with the outer ground of the first coaxial connector touching the fourth and the sixth electrical conductors and the center pin of the first coaxial connector touching the fifth electrical conductor. Further, the moisture-removal system includes at least one first coaxial cable, having a first end and a second end, and comprising a central conductor and an outer shield; the first end of the coaxial cable is attached to a first radio frequency generator and the second end of the first coaxial cable is attached to the first coaxial connector. The moisture-removal system further includes a third assembly of having spaced apart a seventh, an eighth and a ninth electrical conductor, each with a first and a second end, and each extending along the same first direction; each conductor of the third assembly comprising opposing broad top and bottom sides and opposing narrow edges; the broad bottom side of the seventh electrical conductor facing the broad top side of the eighth electrical conductor and the broad bottom side of the eighth electrical conductor facing the broad top side of the ninth electrical conductor; the distance between the narrow edges of each conductor of the third assembly gradually decreasing from their first ends to their second ends such that the first end of the seventh conductor is as wide as the second end of the first conductor, the first end of the eighth conductor is as wide as the second end of the second conductor and the first end of the ninth conductor is as wide as the second end of the third electrical conductor. Similarly, the spacing between the seventh, eighth and ninth electrical conductors gradually decreasing from their first ends to their second ends such that the first end of the seventh electrical conductor touching the second end of the first electrical conductor, the first end of the eighth electrical conductor touching the second end of the second electrical conductor and the first end of the sixth electrical conductor touching the second end of the third electrical conductor. Similarly, the distance between the opposing narrow edges of each of the seventh, eighth and ninth electrical conductors and the spacing between them at their second ends are of the order that a second coaxial connector of a suitable size can be mounted on the third assembly with the outer ground of the second coaxial connector touching the seventh and ninth electrical conductors and the center pin of the second coaxial connector touching the ninth electrical conductor. Further, the moisture-removal system includes at least one 50-ohm coaxial termination connected to the second coaxial connector.

In yet another aspect, the present disclosure provides a moisture-removal system that includes a first assembly of electrical conductors, each extending along a same first direction with each conductor having a first and a second end and each comprising opposing broad top and bottom sides and opposing first and second narrow edges; the conductors of the first assembly are arranged in a same second direction such that the second narrow edge of the first electrical conductor facing the first narrow edge of the second electrical conductor and the second narrow edge of the second electrical conductor facing the first narrow edge of the third electrical conductor and so on; and a first conducting platform having a length not smaller than any of the conductor of the first assembly and a width not smaller than the distance from the first narrow edge of the first electrical conductor to the second narrow edge of the last electrical conductor of the first assembly; the first assembly of the electrical conductors placed above the first conducting platform such that the broad bottom side of each conductor of the first assembly facing the conducting platform; and a material containing moisture at least partially filling the space between the first assembly of the electrical conductors and the first conducting platform. Further, the first conducting platform comprises moving plates or rails that can push the material containing moisture along the second direction. The moisture-removal system further includes a plurality of electric cables and wires that connect the first end of each conductor of the first assembly to a first radio frequency power source and the first conducting platform to the common electrical ground of the same first radio frequency power source.

In yet another aspect, the present disclosure provides a moisture-removal system that includes a first assembly of electrical conductors, each extending along a same first direction with each conductor having a first and a second end and each comprising opposing broad top and bottom sides and opposing first and second narrow edges, and each conductor having at least one hole from its broad bottom side to its broad top side; the conductors of the first assembly are arranged in a same second direction such that the second narrow edge of the first conductor facing the first narrow edge of the second electrical conductor and the second narrow edge of the second electrical conductor facing the first narrow edge of the third electrical conductor and so on; and a first conducting platform having a length not smaller than any of the conductor of the first assembly and a width not smaller than the distance from the first narrow edge of the first electrical conductor to the second narrow edge of the last electrical conductor of the first assembly; the first assembly of the electrical conductors placed above the first conducting platform such that the broad bottom side of each conductor of the first assembly facing the first conducting platform; and a material containing moisture at least partially filling the space between the first assembly of the electrical conductors and the first conducting platform. Further, the first conducting platform comprises moving plates or rails that can push the material containing moisture along the second direction. The moisture-removal system further includes a plurality of electric cables and wires that connect the first end of each conductor of the first assembly to a first radio frequency power source and the first conducting platform to the common electrical ground of the same first radio frequency power source.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1A:
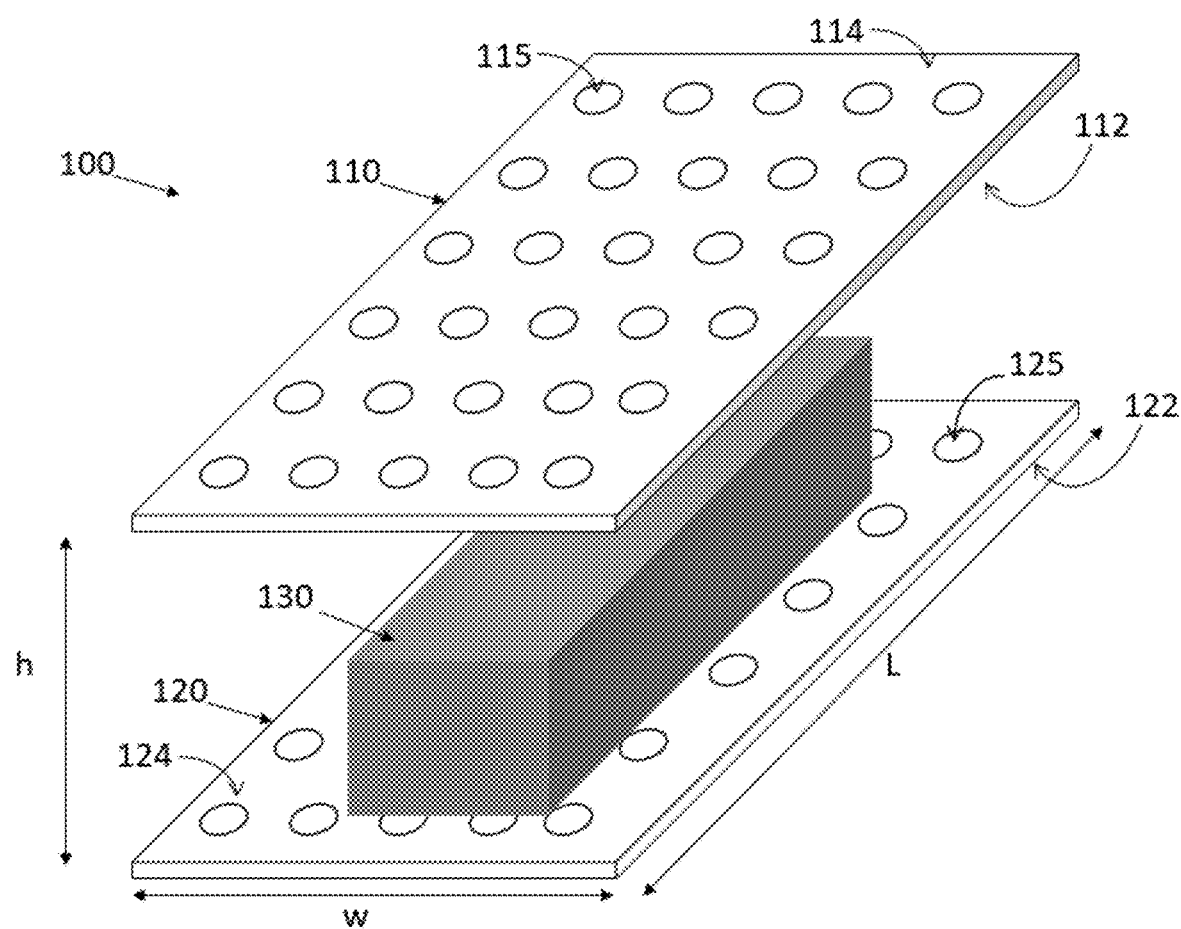
FIG. 1A illustrates one embodiment of the moisture-removal system that includes two electrical conductor and an RF generator.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

The present disclosure provides a new method for removing moisture from a variety of materials including agricultural biomass products (harvest crop, fruit, grains etc.), manure, human waste, construction aggregate materials, wet sand etc. For this purpose, the disclosed moisture-removal systems employ electromagnetic radio frequency power. However, unlike conventional electromagnetic radio frequency drying techniques that rely on high-power dielectric heating of material-moisture mixtures, the disclosed systems employ propagating transverse electromagnetic modes through a material to break its hydrogen bond with water and push the moisture content out of the material using gravity or forced air. Since the disclosed moisture-removal systems do not remove water from a material by evaporation, the drying can occur at low temperatures and any heat damage to the material can be avoided.

In the following description, drawings are provided and referred for the sake of illustration only. Other embodiments can be contemplated and made without departing from the scope or spirit of the present disclosure. As such, the following description should not be taken in a limiting sense. The illustrations, descriptions and language used to describe these do not limit the present disclosure.

Many industries and applications require moisture to be removed from the materials they handle. For example, agricultural crops need to be dried after harvest to preserve their taste and nutrients, reduce storage volume, increase storage life, prevent molding or bacteria growth etc. Similarly, moisture is removed from certain aggregate materials to obtain or retain certain physical and mechanical properties and to avoid any degradation. Further, moisture needs to be removed from manure and other waste for their easier disposal. One traditional moisture-removal technique, quite common with the agricultural products, is to spread out the material containing moisture over a large area and let it dry in the air. However, the space and time constraints make this method impractical for large volumes. Another common moisture-removal technique is the heat-assisted air-drying method in which a material to be dried is loaded into drying bins and hot air is forced through the material until the moisture is reduced to a certain level. This method, however, suffers from low energy efficiencies and leads to significant costs due to the requirement of a heat source either from hydrocarbon fuel or electrical sources. Another important drawback of heat-assisted air drying is the potential heat damage to, for example, the harvest crop as the even distribution of temperature is a big challenge in this drying method.

Industries have also recently considered utilizing electromagnetic radio frequency fields for drying various materials. For example, in agriculture industry, the harvest crop is subject to high-power electromagnetic fields. The electromagnetic energy absorbed by the harvest crop converts into heat, raising the temperature of the harvest crop and the mixed water. When the temperature is increased to the boiling point of the water, it evaporates out of the harvest crop. The electromagnetic heating of a material containing moisture relies on material's dielectric properties, which can be represented by the following equation (1):

$$\varepsilon(f)=\varepsilon_r+j\varepsilon_i \quad (1)$$

Where $\varepsilon$ is called the dielectric constant and is a function of frequency f of the applied electromagnetic fields. The dielectric constant $\varepsilon$ is, in general, a complex quantity with $\varepsilon_r$ being its real part and $\varepsilon_i$ being its imaginary part. The ratio of imaginary part $\varepsilon_i$ to the real part $\varepsilon_r$ of the dielectric constant is called dielectric loss tangent, tan(d):

$$\tan(d)=\varepsilon_i/\varepsilon_r \quad (2)$$

The dielectric loss tangent, tan(d), is a measure of the dielectric absorption of a material. Higher the loss tangent value, higher is the absorption of the applied electromagnetic fields by the material. In general, the dielectric absorption increases with frequency, f. When two or more materials are mixed, the total absorption of the applied electromagnetic fields by the mixture depends on the volume fraction and dielectric properties of each component of the mixture. However, compared to most materials, the loss tangent of water may not be very high. Further, in most materials containing moisture that need to be dried, the volume fraction of the moisture content is significantly lower than that of the material in the mixture. Therefore, when a material-moisture mixture is exposed to electromagnetic radio frequency fields, most of the applied electromagnetic power is absorbed by the material and not by the water. As such, it is the grain, crop or the material in the mixture that absorbs most of the applied electromagnetic radio frequency fields and is heated directly while the temperature of water rises indirectly through convection. Therefore, to evaporate water out of a material, the temperature of the most volume of the material must first rise above the boiling point of water. As the temperature of the material-moisture mixture reaches the water's boiling point, the heated water eventually evaporates out of the material-moisture mixture. However, as the water content in the material-moisture mixture drops due to evaporation, the volume fraction of the material in the material-moisture mixture increases with the material absorbing more and more power from the applied electromagnetic fields. This leads to even higher temperatures in the already dried section of the material-moisture mixture as compared to the portions with significant water content, causing low heating efficiency and potential heat damage to the material in the material-moisture mixture. Further, the efficiency of the electromagnetic radio frequency drying system continues to drop as drying process progresses. As such, avoiding heat damage to the harvest crop or other materials in the final stages of electromagnetic radio frequency drying continues to be a challenge in the industry.

Yet another challenge to the radio frequency drying technique is that the dielectric loss tangent is a function of frequency with the dielectric loss tangent values increasing with frequency, in general. However, the ability of electromagnetic fields to penetrate into a material is inversely related to frequency. That is, while electromagnetic radio frequency drying maybe more efficient at higher frequencies, the electromagnetic field penetration into materials containing moisture is lower. Therefore, only a small amount of a material can be dried using conventional electromagnetic radio frequency drying techniques. For large volumes, electromagnetic radio frequency drying at higher frequencies leads to non-uniform heating with outer layers of the material drying faster while the internal layers remaining at lower temperature and not dried. Similarly, at lower frequencies, since the dielectric loss tangent values are relatively low, in general, higher amplitudes of electromagnetic fields are needed to achieve evaporation of the water. Another drawback of electromagnetic radio frequency moisture-removal method is that the dielectric properties of most materials are not readily available. Without the adequate knowledge of these properties, it is difficult to design an efficient electromagnetic radio frequency moisture-removal system. Further, the dielectric properties of a material-moisture mixture will vary throughout the drying process as moisture content as well as the total volume of the material-moisture mixture changes during the drying process. This means that an electromagnetic radio frequency moisture-removal system must be continuously adjusted and tuned to its load throughout the drying process. This slows down the drying, leading to poor time and energy efficiencies.

While the electromagnetic radio frequency moisture-removal systems have concentrated upon the absorption of electromagnetic energy by a material-moisture mixture, an important property of water has been neglected so far in these systems. That is the movement of water when it is subject to an external magnetic field. Exposure to a varying magnetic field and its associated electromagnetic effects have been shown to disrupt inter and intramolecular hydrogen bonds of water molecules. This is because water being diamagnetic becomes polarized in the presence of magnetic fields. This polarization of water molecules physically moves and reorients water molecules within a magnetic field. The orientation of the magnetic field is important with respect to hydrogen bond bending or breakage because any magnetic field aligned in the direction of the hydrogen bond increases the strength of the hydrogen bond whereas any magnetic field orthogonal to the direction of the hydrogen bond decreases the bond strength due to the reorientation forces that are created by the magnetic field. In addition, even the partial alignment of water molecules with an electric field will cause preexisting hydrogen bonding to become bent or broken, thus reducing the surface tension and hydrogen bonding of water. In fact, weak electric fields and strong perpendicular magnetic fields have been shown to increase the evaporation rate. As an added benefit, water that is exposed to constant transverse magnetic or electric fields also gives rise to a strong antimicrobial effect.

The inventors of the present disclosure have discovered that an efficient way to break the hydrogen bonding of water in a material-moisture mixture is to provide simultaneous transverse electric and magnetic fields. In the embodiments that are disclosed here, a fundamental propagating electromagnetic mode is launched in a material-moisture mixture using proper arrangement of metal conductors. Since a propagating electromagnetic field comprises transverse electric and magnetic field components, the material-moisture mixture is subject to electromagnetic de-bonding forces which guide the water contents out of a material-moisture mixture. The advantage of the disclosed methods is that water is not evaporated out of the material by heating the material-moisture mixture but instead the proper orientation of electromagnetic fields is used to guide the water out of the material-moisture mixture. In fact, the inventors have observed that the water can be removed in some cases while the material-moisture fixture remains at freezing temperature. As such, the disclosed methods are highly energy efficient and eliminate any potential damage to the materials, such as harvest crop, in a material-moisture mixture.

In the disclosed embodiments, the moisture-removal system designs include structures that allow a propagating electromagnetic wave to travel within a material-moisture mixture such as harvest crop or biomass material. This contrasts the present disclosure with existing electromagnetic radio frequency moisture-removal systems which use dielectric or electrostatic heating of the materials. A propagating electromagnetic wave can be launched by an arrangement of electrical conductors, spaced apart appropriately for a given frequency, and the material-moisture mixture placed within these electrical conductors. Since the needed spacing between the electrical conductors depends upon the dielectric properties of the material in between the conductors, the spacing must be varied as the water content in the material-moisture mixture drops during the drying process. Alternately, the space between the electrical conductors is only partially filled with the material-moisture mixture and hence the impact of material-moisture mixture's dielectric properties on the wave impedance of the propagating electromagnetic mode is minimal. Such partial fulfillment of the space avoids constant adjustment of the spacing between the electrical conductors to maintain the wave impedance of the propagating electromagnetic mode.

In one embodiment, two electrical conductors are arranged such that a propagating electromagnetic wave can be launched in the material-moisture mixture. In another embodiment, three conductors are arranged such that a propagating electromagnetic wave can be launched in the material-moisture mixtures. Further provisions, such as ventilation holes in the electrical conductors can be provided to allow forced air flow through the moisture-removal system. These ventilation holes, as long as their size is only a small fraction of the wavelength (generally, less than one tenth of the wavelength), do not impact the wave impedance of the propagating electromagnetic modes. In yet another embodiment, the moisture-removal system comprises several moisture-removal subsystems acting in a cascaded manner. These small moisture-removal systems include electric conductors spaced apart and placed above a conducting platform. Before drying process starts, these subsystems are tuned to different moisture content levels for a given material-moisture mixture. The conducting platform comprises of moving rails or plates that can push the material-moisture mixture from one moisture-removal subsystem to the next. As such, when a material-moisture mixture with high water content is placed on the conducting platform, the mixture is moved from one subsystem to the next and the drying progresses almost in a continuous manner.

As is generally understood, the strength of electromagnetic fields is uniform in between the conductors supporting a propagating electromagnetic field. As such, location of the material within such structures should not be important. However, the inventors of this disclosure have surprisingly found that the material that comes in the contact with the metal conductors dries faster. As such, the present embodiments provide preferred embodiments where the material stays in contact with at least one metal conductor throughout the drying process.

FIG. 1 shows a perspective view of the biomass moisture-removal system 100, according to one aspect of the disclosure. The biomass moisture-removal system 100 includes spaced apart first electrical conductor 110 and second electrical conductor 120, each having the same width "w", and extending along a first direction for a length "L". The first electrical conductor 110 includes a first broad top side 114, and a first broad bottom side 112, and the second electrical conductor 120 includes a second broad top side 124, and a second broad bottom side 122. The first and second electrical conductors 110, 120, are disposed such that the first broad bottom side 112 faces the second broad top side 124. A biomass material 130 that needs to be dried is disposed of in between the first electrical conductor 110 and the second electrical conductor 120. In some cases, the biomass material 130 completely fills the space between the first and the second electrical conductors 110 and 120; however, in other cases, the biomass material 130 only partially fills the spacing between the first and the second electrical conductors 110 and 120. To launch a propagating electromagnetic wave in between the two electrical conductors, the height "h" between the first and the second electrical conductor, 110 and 120, and their width "w" must be carefully chosen. However, these values depend on the dielectric constant el of the biomass material. Further, the value of el depends on the amount of moisture present in the biomass material. Therefore, as the drying process progresses and the water is removed from the biomass material, value of el will change. As such, the height "h" and width "w" may need to be continually adjusted to avoid any RF reflections to the RF generator. Alternately, if the biomass material 130 occupies a very small space between the first electrical conductor 110 and the second electrical conductor 120, then effect of el of the biomass material on the width "w" and height "h" can be ignored. The propagating electromagnetic wave will help break the hydrogen bond of the moisture with the biomass material. Once the bond is broken the water can flow easily. To remove the water from the system, biomass moisture-removal system may include a fan that pushes the air through the biomass material, according to another aspect of the disclosure. To provide air flow, the first and the second electrical conductors 110, 120 are respectively provided with small holes 115 and 125.

Figure 1B:
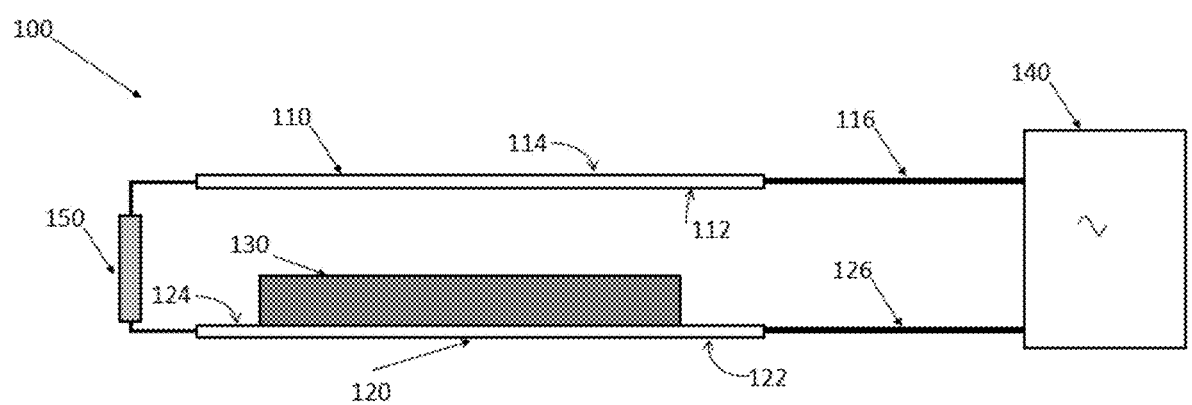
FIG. 1B provides a cross-sectional view of the embodiment illustrated in FIG. 1A.
Figure 1C:
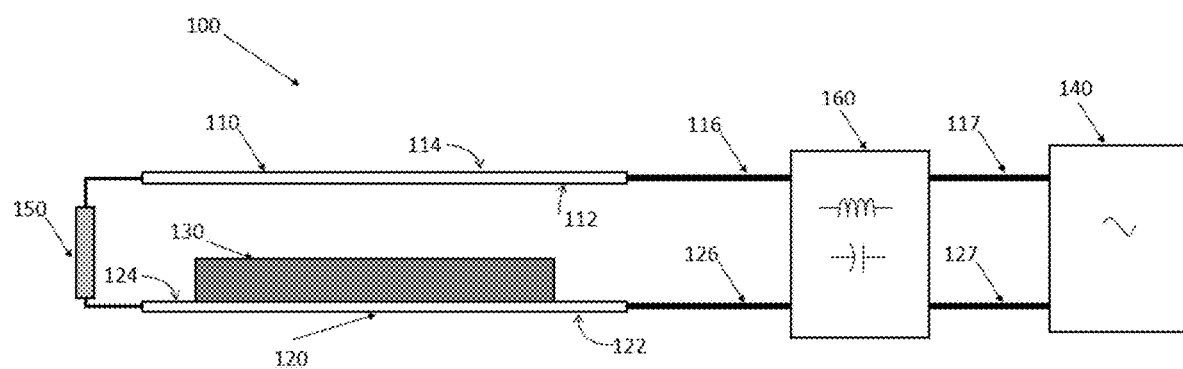
FIG. 1C provides yet another illustration of the moisture-removal system of FIG. 1A that also includes a matching network.

FIG. 1B shows a cross-sectional view of the biomass moisture-removal system 100, according to one aspect of the disclosure. As illustrated, the biomass moisture-removal system 100 is connected to a first RF generator 140 via two electrical wires 116 and 126. Wire 116 connects the first electrical conductor 110 to the RF output port of RF generator 140 while the wire 126 connects the second electrical conductor 120 to the ground of RF generator 140. Alternatively, the wires 116 and 126 can form a first coaxial cable, according to yet another aspect of the present disclosure, with wire 116 being the central conductor of the first coaxial cable and wire 126 being the outer shield of the first coaxial cable. The other end of the biomass moisture-removal system 100, can either be left open or it can be connected with a matched load, e.g. 50 ohms, to avoid any RF reflections back to the biomass moisture-removal system. The direct connection of the first RF generator 140 with the biomass moisture-removal system 100, as illustrated in FIG. 1B, may be sufficient for small lengths of the moisture-removal systems and for small RF powers. For relatively larger sizes of the moisture-removal systems, the input impedance of the moisture-removal system must be carefully matched with the wires/coaxial cables supplying the RF power from the RF generator 140. One possible embodiment is illustrated in FIG. 1C, according to yet another aspect of the present disclosure. Here, an impedance matching network 160, comprising at least one variable inductor and one variable capacitor. By varying the inductance and the capacitance of the matching network 160, the reflected RF power to the RF generator 140 can be reduced.

Figure 2A:
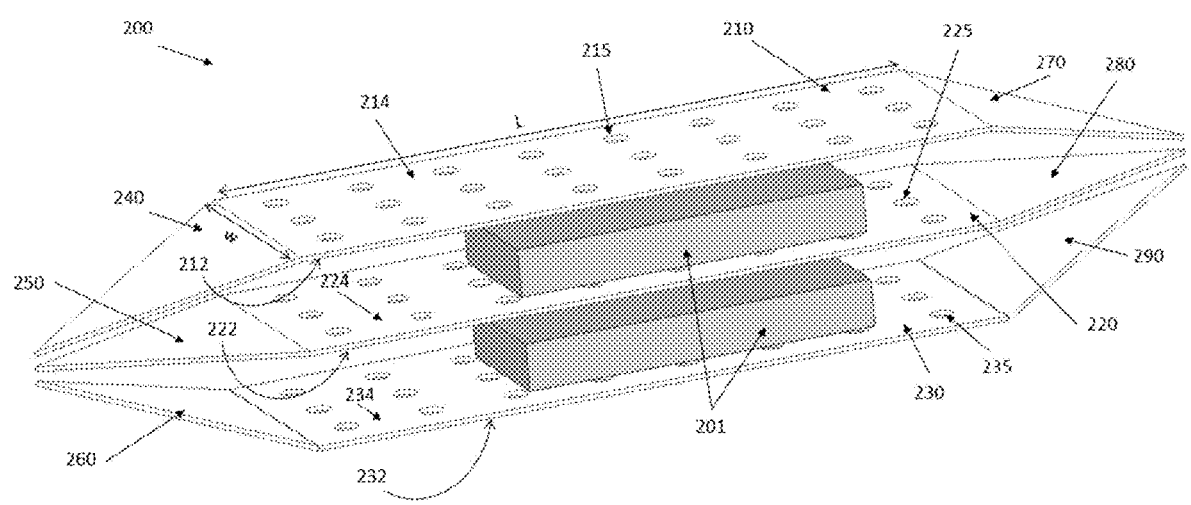
FIG. 2A illustrates another embodiment of the moisture-removal system that includes three electrical conductors.
Figure 2B:
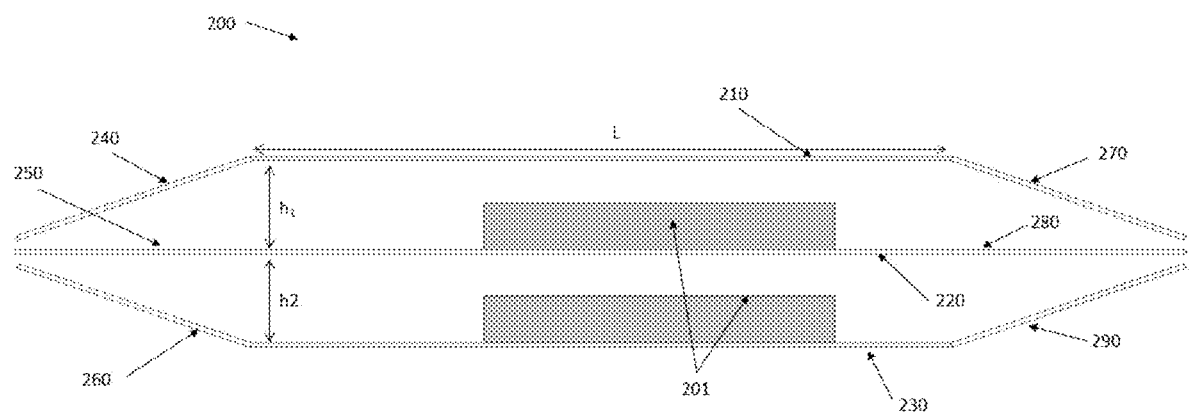
FIG. 2B provides a cross-sectional view of the embodiment illustrated in FIG. 2A.
Figure 2C:
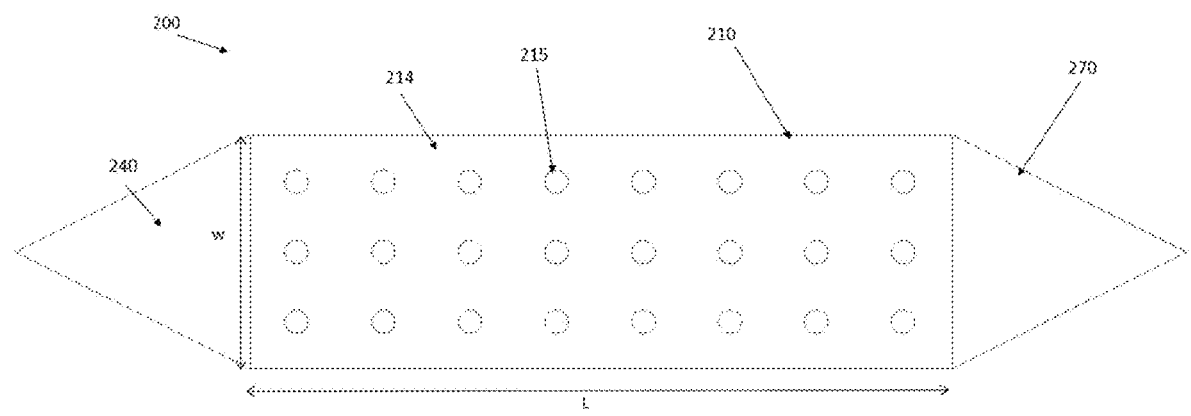
FIG. 2C provides a top view of the embodiment illustrated in FIG. 2A.

FIG. 2A provides a perspective view of yet another aspect of the present disclosure that avoids the need to continually match the input impedance using a matching network. FIG. 2B provides the side and FIG. 2C provides the top view of the same embodiment of the disclosed moisture-removal system. As illustrated, the disclosed moisture-removal system 200 includes spaced apart a first electrical conductor 210, a second electrical conductor 220 and a third electrical conductor 230, each having the same width "w" and each extended along a first direction for a length "L". The first electrical conductor 210 includes a first broad top side 214, and a first broad bottom side 212, the second electrical conductor 220 includes a first broad top side 224, and a second broad bottom side 222, and the third electrical conductor 230 includes a first broad top side 234 and a second broad bottom side 232. The electrical conductors 210, 220, and 230 are arranged such that the broad bottom side 212 of 210 faces the broad top side 224 of 220 and the broad bottom side 222 of 220 faces the broad top side 234 of 230. A material 201 containing moisture is placed in between either the conductors 210 and 220 or between 220 and 230. To launch a propagating electromagnetic wave in between these electrical conductors, the height "h$_1$" between the conductors 210 and 220 and the height "h$_2$" between conductors 220 and 230 along with the width "w" of 210, 220 and 230 must be carefully chosen. However, these values depend on the dielectric constant c of the material 201. Further, the value of c depends on the volume percentage of the moisture content present in the material 201. As the drying process progresses and the water is removed from the material 201, value of c will change. As such, the heights "h$_1$" and "h$_2$" as well as the width "w" may need to be continually adjusted to avoid any impedance mismatch with the impedance of the feed line from the radio frequency generator. Alternately, if the material 201 occupies very small volume of the space between the conductors 210 and 220 or between 220 and 230, then effect of c on the width "w" and the heights "h$_1$" and "h$_2$" can be ignored. The propagating electromagnetic wave will break the hydrogen bond of the moisture with the material 201 and once the bond is broken the water will flow out of the material easily. To remove the water, the moisture-removal system may include a fan that pushes the air through the material 201, according to another aspect of the disclosure. To provide air flow, the electrical conductors 210, 220 and 230 are provided with small holes 215, 225 and 235. The air can be forced or sucked out via a fan. Since the disclosed embodiments are used to break the Hydrogen bond of water from the material, and not to evaporate the water, it is easier to arrange the moisture-removal system and the forced airflow such that the water flows in the direction of gravity. The largest dimension of these holes 215, 225 and 235 must not be greater than one tenth of the operating radio frequency wavelength. However, practical reasons may further limit the size of these holes. For example, a part of material 201 may fall through the holes if they are too large. Similarly, there is no limit to the minimum size of the holes 215, 225 and 235, as long as the proper airflow can be maintained. The moisture-removal system 200 also includes three electrical conductors 240, 250 and 260 on the first end 201. The electrical conductors are arranged such that the broad bottom side of 240 faces the broad top side of 250 and broad bottom side of 250 faces broad top side of 260. The conductor 240 is attached to conductor 210, the conductor 250 is attached to the conductor 220 and the conductor 260 is attached to the conductor 230. At the plane of their attachment, the width of 240 is the same as the width of 210, the width of 250 is the same as the width of 220 and the width of 260 is the same as the width of 230. However, the widths of 240, 250 and 260 gradually decreases away from the plane of attachment. Similarly, at the plane of attachment, the distance between 240 and 250 is the same as the distance between 210 and 220 and the distance 250 and 260 is equal to the distance between 220 and 230. However, the distance between 240 and 250 as well as the distance between 250 and 260 continuously decrease away from the plane of attachment. At the farthest plane of connection the distances between these conductors and their widths become small enough that a standard RF coaxial connector can be attached such that the center pin of the coaxial connector is attached to 250 and while 240 and 260 are attached to the ground of the coaxial connector. The gradual increase in the widths of 240, 250 and 260 and their inter-spacing provides a gradual transformation of the coaxial electromagnetic mode to the parallel plate transmission line mode. As such, 240, 250 and 260 together form an impedance or a mode transition network where at every point along the length of this transition, the widths and their inter-spacing must be chosen such that impedance of the transition remains the same as that of the conductors 210, 220 and 230. In most case, the transition (conductors 240, 250 and 260) at the RF input should be sufficient. While at the second end of the moisture-removal system 200, lumped loads can be connected. However, if needed a similar transition formed by conductors 270, 280 and 290 can be used. The benefit of using these transitions, especially at the input, is that it eliminates the need for the matching network of FIG. 1C.

An alternative embodiment includes a moisture-removal system, comprising: having spaced apart a first and a second and a third electrical conductor extending along a same first direction, each electrical conductor comprising opposing broad top and bottom sides and opposing narrow edges, the broad bottom side of the first electrical conductor facing the broad top side of the second electrical conductor and the broad bottom side of the second electrical conductor facing the broad top side of the third electrical conductor; and a material containing moisture at least partially filling the space between the first and the second electrical conductor or between the second and the third electrical conductor; and at least one first wire with a first end and a second end, the first end of the first wire attached to a first radio frequency generator and the second end of the first wire attached to the first end of the second electrical conductor; and at least one second wire with a first and a second end, with the first end of the second wire attached to the electrical ground of the first radio frequency generator and the second end of the second wire attached to the first end of the first electrical conductor; and at least a third wire with a first and a second end, with the first end of the third wire attached to the electrical ground of the first radio frequency generator and the second end of the third wire attached to the first end of the third electrical conductor. This embodiment can include where the material containing moisture makes a direct contact with either of the first or the second or the third electrical conductor. This embodiment can also include where the material containing moisture makes a direct contact with all three first, second and the third electrical conductor. This embodiment can also include where the material containing moisture makes no contact with any of the first or the second or third electrical conductor. This embodiment can also include where the radio frequency of the first radio frequency generator is between 1 MHz to 1 GHz. This embodiment can also include where the radio frequency of the first radio frequency generator is 13.56 MHz. This embodiment can also include where the radio frequency power of the radio frequency generator is at least 500 watts. This embodiment can also include where the radio frequency power of the first radio frequency generator is at least 1000 watts. This embodiment can also include where the radio frequency power of the first radio frequency generator is at least 1000 watts. This embodiment can also include where the second and the third wire constitute an outer shield of a first coaxial cable and the first wire constitute the central conductor of the first coaxial cable.

Another embodiment of a moisture-removal system, includes having spaced apart a first and a second and a third electrical conductor extending along a same first direction, each of the first and second and the third electrical conductor comprising opposing broad top and bottom sides and opposing narrow edges, the broad bottom side of the first electrical conductor facing the broad top side of the second electrical conductor and the broad bottom side of the second electrical conductor facing the broad top side of the third electrical conductor; and a material containing moisture at least partially filling the space between the first and the second electrical conductor or the space between the second and the third electrical conductor; and a first inductor-capacitor assembly of at least one inductor and at least one capacitor, the inductor and the capacitor electrically attached with each other; the first inductor-capacitor assembly having a first end, a second end and a third end; and at least one first wire with a first end and a second end, the first end of the first wire attached to a first radio frequency generator and the second end of the first wire attached to the first end of the first inductor-capacitor assembly; and at least one second wire with a first end and a second end, with the first end of the second wire attached to the electrical ground of the first radio frequency generator and the second end of the second wire attached to the third end of the first inductor-capacitor assembly; and at least a third and a fourth electrical wire, each with a first end and a second end, the first end of the third wire attached to the second end of the first inductor-capacitor assembly, and the second end of the third wire attached to the first end of the second electrical conductor; and the first end of the fourth wire is attached to the third end of the first inductor-capacitor assembly and the second end of the fourth wire attached to the first end of the first electrical conductor and to the first end of the third electrical conductor. This embodiment can also include where the material containing moisture makes a direct contact with either of the first or the second or the third electrical conductor. This embodiment can also include where the material containing moisture makes a direct contact with all three first, second and the third electrical conductor. This embodiment can also include the material containing moisture makes no contact with any of the first or the second or third electrical conductor. This embodiment can also include where the radio frequency of the first radio frequency generator is between 1 MHz to 1 GHz. This embodiment can also include where the radio frequency of the first radio frequency generator is 13.56 MHz. This embodiment can also include where the radio frequency power of the radio frequency generator is at least 500 watts. This embodiment can also include where the radio frequency power of the first radio frequency generator is at least 1000 watts. This embodiment can also include where the radio frequency power of the first radio frequency generator is at least 1000 watts. This embodiment can also include where the first wire is a central conductor of a first coaxial cable and the second wire is the outer shield of the first coaxial cable and the third wire is a central conductor of a second coaxial cable and the fourth wire is an outer shield of the second coaxial cable.

Yet another alternative embodiment of a moisture-removal system includes a first assembly of having spaced apart a first, a second and a third electrical conductor, each with a first end and a second end, extending along a same first direction, each conductor comprising opposing broad top and bottom sides and opposing narrow edges, the broad bottom side of the first electrical conductor facing the broad top side of the second electrical conductor and the broad bottom side of the second electrical conductor facing the broad top side of the third electrical conductor; and a material containing moisture at least partially filling the space between the first and the second electrical conductor or the space between the second and the third electrical conductor; and a second assembly of having spaced apart a fourth, a fifth and a sixth electrical conductor, each with a first end and a second end, extending long the same first direction and comprising opposing broad top and bottom sides and opposing narrow edges, the broad bottom side of the fourth electrical conductor facing the broad top side of the fifth electrical conductor and the broad bottom side of the fifth electrical conductor facing the broad top side of the sixth electrical conductor; and the distance between the opposing narrow edges of each of the fourth, fifth and sixth electrical conductor gradually varying and the spacing between the fourth, fifth and sixth conductor gradually varying such that the second end of the fourth conductor is as wide as the first end of the first conductor, the second end of the fifth conductor is as wide as the first end of the second conductor and the second end of the sixth conductor is as wide as the first end of the third electrical conductor, and the spacing between the second ends of the fourth and the fifth conductor is equal to the spacing between the first ends of the first and the second conductor, and the spacing between the second ends of the fifth and sixth conductors is equal to the spacing between the first ends of the second and third conductors; and the distance between the opposing narrow edges of the fourth, fifth and sixth conductor at their first ends and the spacing between the fourth, fifth and sixth conductor is such that a first coaxial connector of suitable size can be mounted on these conductors with the outer ground of the connector making a contact with the fourth and sixth conductor and the center pin of the coaxial connector making a contact with the fifth conductor; and the second end of the fourth conductor attached to the first end of the first conductor, the second end of the fifth conductor attached to the first end of the second conductor and the second end of the sixth conductor attached to the first end of the third conductor; and at least one first coaxial cable with a first end and a second end, the first end of the first coaxial cable is attached to a first radio frequency generator and the second end of the first coaxial cable is attached to the first coaxial connector. This embodiment can also include where the material containing moisture makes a direct contact with any of the first or the second or the third electrical conductor. This embodiment can also include where the material containing moisture makes a direct contact with each of the first, the second and the third electrical conductor. This embodiment can also include where the material containing moisture makes no contact with any of the first, the second or third electrical conductor. This embodiment can also include where the radio frequency of the first radio frequency generator is between 1 MHz to 1 GHz. This embodiment can also include where the radio frequency of the first radio frequency generator is 13.56 MHz. This embodiment can also include where the radio frequency power of the radio frequency generator is at least 500 watts. This embodiment can also include where the radio frequency power of the first radio frequency generator is at least 1000 watts. This embodiment can also include where the radio frequency power of the first radio frequency generator is at least 1000 watts.

This embodiment can also include which also includes a third assembly of having spaced apart a seventh, an eighth and a ninth electrical conductor, each with a first end and a second end, extending along the same first direction and comprising opposing broad top and bottom sides and opposing narrow edges, the broad bottom side of the seventh electrical conductor facing the broad top side of the eighth electrical conductor and the broad bottom side of the eighth electrical conductor facing the broad top side of the ninth electrical conductor; and the distance between the opposing narrow edges of each of the seventh, eighth and ninth electrical conductor gradually varying and the spacing between the seventh, eighth and the ninth conductor gradually varying such that the second end of the first conductor is as wide as the first end of the seventh conductor, the first end of the eighth conductor is as wide as the second end of the second conductor and the first end of the ninth conductor is as wide as the second end of the third electrical conductor, and the spacing between the first ends of the seventh and the eighth conductor is equal to the spacing between the second ends of the first and the second conductor, and the spacing between the first ends of the eighth and ninth conductors is equal to the spacing between the second ends of the second and third conductors; and the distance between the opposing narrow edges of the seventh, eighth and ninth conductor at their second ends and the spacing between the seventh, eighth and ninth conductor is such that a second coaxial connector of suitable size can be mounted on these conductors with the outer ground of the second coaxial connector making a contact with the seventh and ninth conductor and the center pin of the second coaxial connector making a contact with the eighth conductor; and the first end of the seventh conductor attached to the second end of the first conductor, the first end of the eighth conductor attached to the second end of the second conductor and the first end of the sixth conductor attached to the second end of the third conductor. This embodiment can also include where the material containing moisture makes a direct contact with any of the first or the second or the third electrical conductor. This embodiment can also include where the material containing moisture makes a direct contact with each of the first, the second and the third electrical conductor. This embodiment can also include where the material containing moisture makes no contact with any of the first, the second or third electrical conductor. This embodiment can also include where the radio frequency of the first radio frequency generator is between 1 MHz to 1 GHz. This embodiment can also include where the radio frequency of the first radio frequency generator is 13.56 MHz. This embodiment can also include where the radio frequency power of the radio frequency generator is at least 500 watts. This embodiment can also include where the radio frequency power of the first radio frequency generator is at least 1000 watts. This embodiment can also include where the radio frequency power of the first radio frequency generator is at least 1000 watts.

Another embodiment of a moisture-removal system includes a first assembly of electrical conductors, each extending along a same first direction with each conductor having a first and a second end and each comprising opposing broad top and bottom sides and opposing first and second narrow edges, the conductors of the first assembly arranged in a same second direction such that the second narrow edge of the first electrical conductor facing the first narrow edge of the second electrical conductor and the second narrow edge of the second electrical conductor facing the first narrow edge of the third electrical conductor and so on, and a first conducting platform having a length not smaller than any of the conductor of the first assembly and a width not smaller than the distance from the first narrow edge of the first electrical conductor to the second narrow edge of the last electrical conductor of the first assembly, the first assembly of the electrical conductors placed above the first conducting platform such that the broad bottom side of each conductor of the first assembly facing the conducting platform, and a material containing moisture at least partially filling the space between the first assembly of the electrical conductors and the first conducting platform; and a plurality of electric cables and wires that connect the first end of each conductor of the first assembly to a first radio frequency power source and the first conducting platform to the common electrical ground of the same first radio frequency power source. This embodiment can also include where the first conducting platform comprises moving plates or rails that push the material containing moisture along the second direction. This embodiment can also include where each electrical conductor of the first assembly have at least one hole from its broad bottom side to its broad top side. This embodiment can also include where the first assembly comprises at least four electrical conductors. This embodiment can also include where the first assembly comprises at least three electrical conductors. This embodiment can also include where the first assembly comprises at least two electrical conductors. This embodiment can also include where the material containing moisture is a harvest crop. This embodiment can also include where the material containing moisture is a waste material including manure. This embodiment can also include where the material containing moisture is a construction aggregate material.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A moisture-removal system comprising:
two or more subsystems each having:
a first electrical conductor and a second electrical conductor extending along a same first direction, the first electrical conductor and the second electrical conductor each comprising opposing broad top and bottom sides, wherein the broad bottom side of the first electrical conductor is facing the broad top side of the second electrical conductor, the first electrical conductor and the second electrical conductor being separated by a space adapted to receive a material containing moisture; and
a radio frequency generator operably couplable to the first electrical conductor and the second electrical conductor via a first plurality of wires, the radio frequency generator configured to be tunable to a radio wavelength as determined by a composition and a moisture content level of the material containing moisture; and
a first conducting platform parallel with and positioned below the two or more subsystems, the first conducting platform having a plurality of plates configured to transport the material containing moisture across the two or more subsystems in a cascaded manner.

2. The moisture-removal system of claim 1, wherein for each subsystem, at least one of the first electrical conductor and the second electrical conductor contains at least one hole having a largest dimension equal to or less than one tenth of the radio wavelength of the radio frequency generator.

3. The moisture-removal system of claim 1, wherein for each subsystem, at least one of the first electrical conductor and the second electrical conductor contains at least one hole having a largest dimension equal to or less than one twentieth of the radio wavelength of the radio frequency generator.

4. The moisture-removal system of claim 1, wherein for each subsystem, at least one of the first electrical conductor and the second electrical conductor contains at least one hole having a largest dimension equal to or less than one fiftieth of the radio wavelength of the radio frequency generator.

5. The moisture-removal system of claim 1, wherein for each subsystem, at least one of the first electrical conductor and the second electrical conductor contains at least one hole having a largest dimension equal to or less than one hundredth of the radio wavelength of the radio frequency generator.

6. The moisture-removal system of claim 1, wherein each subsystem further comprises an impedance matching networking operably couplable to the first electrical conductor and the second electrical conductor via a second plurality of wires.

7. The moisture-removal system of claim 6, wherein the impedance matching network of each subsystem comprises at least one variable inductor and at least one variable capacitor configured to operate in tandem.

8. The moisture-removal system of claim 1, wherein each subsystem further comprises an inductor-capacitor assembly having at least one inductor and at least one capacitor, the inductor-capacitor assembly operably couplable to the radio frequency generator via a third plurality of wires.

9. The moisture-removal system of claim 1, wherein each subsystem further comprises a common electrical grounding system operably couplable to both the radio frequency generator and the second electrical conductor via a fourth plurality of wires.

10. The moisture-removal system of claim 1, wherein the first conducting platform has a length greater than or equal to both a length of the first electrical conductor and a length of the second electrical conductor.

11. The moisture-removal system of claim 1, wherein the first conducting platform has a width greater than or equal to both a width of the first electrical conductor and a width of the second electrical conductor.

12. The moisture-removal system of claim 1, wherein the material containing moisture is continuously in direct contact with at least one of the first electrical conductor and the second electrical conductor of each subsystem.

13. The moisture-removal system of claim 1, wherein the material containing moisture makes no contact with both the first electrical conductor and the second electrical conductor of each subsystem.

14. The moisture-removal system of claim 1, wherein for each subsystem, the radio frequency generates operates at a radio frequency between 1 MHz and 1 GHz.

15. The moisture-removal system of claim 1, wherein for each subsystem, the radio frequency generator operates at a radio frequency of 13.56 MHz.

16. The moisture-removal system of claim 1, wherein for each subsystem, the radio frequency generator operates at a radio frequency power of at least 500 watts.

17. The moisture-removal system of claim 1, wherein for each subsystem, the radio frequency generator operates at a radio frequency power of at least 1000 watts.

18. The moisture-removal system of claim 1, wherein each subsystem further comprises at least one first coaxial cable operably couplable to each of the radio frequency generator, the first electrical conductor, and the second electrical conductor, the at least one first coaxial cable having a central conductor and an outer shield.

19. The moisture-removal system of claim 1, wherein the first conducting platform is configured to transport multiple materials containing moisture simultaneously in a cascaded manner.

20. The moisture-removal system of claim 1, wherein the material containing moisture is a harvest crop, a waste material, or a construction aggregate material.

\* \* \* \* \*